United States Patent [19]

Rickert

[11] 3,992,782

[45] Nov. 23, 1976

[54] LOW PROFILE GUN SIGHT

[76] Inventor: Glenn E. Rickert, Community State Bank Building, Huntington, Ind. 46750

[22] Filed: Mar. 27, 1975

[21] Appl. No.: 562,497

[52] U.S. Cl. .................................... 33/246; 356/252

[51] Int. Cl.² ........................ F41G 1/38; G02B 23/10

[58] Field of Search .............. 356/251, 252; 33/245, 33/246, 247, 248, 249, 250

[56] References Cited

UNITED STATES PATENTS

| | | | |
|---|---|---|---|
| 683,203 | 9/1901 | Grubb | 356/251 |
| 2,472,809 | 6/1949 | Decker | 356/251 |
| 3,153,856 | 10/1964 | Felix | 33/250 |
| 3,297,389 | 1/1967 | Gibson | 33/245 |
| 3,645,635 | 2/1972 | Steck | 356/252 |
| 3,836,263 | 9/1974 | Rickert | 356/251 |
| 3,880,529 | 4/1975 | Althouse et al. | 356/251 |

*Primary Examiner*—Steven L. Stephan

[57] ABSTRACT

A low profile gun sight suitable for use on a small firearm such as a handgun, is disclosed having a hollow sight housing containing optical elements including at least a collimating lens, a first fully reflective optical element and a second semitransparent optical element arranged in periscopic relation and fixed within the housing, and reticle indicia means movably supported within the housing, the housing having first and second openings at opposite ends of a sight path through the housing from an observer to a target which passes through the semitransparent optical element as well as a third opening for allowing light from the general target area to illuminate the reticle indicia so that a collimated image of the reticle indicia may be superimposed on the target view. Horizontal and vertical adjustment screws pass through the housing in generally mutually perpendicular directions to provide for change of aim of the sight with the first and second optical elements providing a line of sight from the observer to the reticle indicia which is deviated from the sight path through the housing in a direction oblique to both of the generally mutually perpendicular directions. The housing may be formed in two portions, each having a transverse generally cylindrical aperture with a hollow sleeve snugly engaging both transverse apertures to simultaneously provide a light pathway between the first and second portions through the sleeve and a mechanical connection between the portions. The hollow sleeve may be fastened in each of the transverse apertures by an adhesive material with one end of the sleeve forming a narrow annular optical element mounting surface for the collimating lens.

4 Claims, 4 Drawing Figures

LOW PROFILE GUN SIGHT

BACKGROUND OF THE INVENTION

The present invention relates to reflex sighting devices and more particularly to such devices having a low profile for attachment to small firearms such as handguns.

Optical sighting devices employing other than the simple cylindrical tube construction of telescopic sights have appeared in recent years and are typified by U.S. Pat. Nos. 3,439,970; 3,524,710; 3,645,635; and 3,836,263 as well as copending application Ser. Nos. 402,376 and 460,216 the last-mentioned application now U.S. Pat. No. 3,915,552. A mounting system for such devices having particular utility in conjunction with the present invention, is disclosed in copending application Ser. No. 562,498 entitled "Recoil Resistant Mounting System" filed on even date herewith. The disclosure of the last mentioned copending application is therefore specifically incorporated herein by reference.

The foregoing nontelescopic optical sights are not well suited to the handgun environment since they generally employ vertically superposed light pathways resulting in structure extending above the handgun a distance such as to be cumbersome and render holstering of the handgun difficult. The problem becomes more acute the further from the user's eye the sight is to be employed since for any given sighting opening the field of view is inversely proportional to the distance of the sight from the user's eye. That is to say, that to provide the same field of view when using a sight located more remote from the user's eye requires a larger sight opening resulting in an even larger and more cumbersome structure. Handgun sights are frequently employed at a greater distance from the user's eye than similar sights on shoulder arms and therefore, on the very weapon where compactness is an important virtue, optical sights therefor suffer from the defect of being large and detract from the compact aspect of the weapon.

SUMMARY OF THE INVENTION

Among the several objects of the present invention may be noted the provision of a firearm sight especially suited to a handgun environment; the provision of a firearm sight which, when mounted, lies in close proximity to the bore of the firearm; the provision of an unobtrusive reflex sight; the provision of a unique housing configuration for a firearm sight; the provision of a reflex sight having a deviated line of sight from an observer to reticle indicia which is oblique to both the horizontal and vertical directions, yet having independent vertical and horizontal adjustments to provide independent horizontal and vertical change of aim of the sight; the provision of a firearm sight having optical surfaces which are protected from the deposition of lead, powder and other fouling materials which may occur in an area rearward of the handgun muzzle when the handgun is discharged; and the provision of a firearm sight housing, which may be fabricated in two portions and then joined together by a sleeve which simultaneously forms a strong mechanical connection and a light pathway between the portions.

In general, and in one form of the invention, a firearm sight has a housing including first and second portions with each portion having at least one generally cylindrical aperture therein forming respective light passageways and a transverse generally cylindrical aperture in each portion intersecting the respective light passageway and communicating with the corresponding transverse aperture in the other portion when the two portions are joined, and including means for securely joining the two portions comprising a sleeve snugly engaging the transverse apertures in each portion to simultaneously provide a light pathway between the portions through the sleeve and a mechanical connection between the portions.

Also, in general, a firearm sight is provided comprising a housing having a pair of generally cylindrical apertures displaced one from the other with the axes thereof extending generally parallel to one another with a reticle indicia and means supporting the reticle indicia in one of the apertures. The housing further contains means for superimposing a view of the reticle indicia and a target view through the other of the apertures and has mounting means thereon for securing the sight to a firearm with the other aperture extending generally parallel to and in close proximity to the bore of the firearm barrel with the axis of the firearm barrel bore and the axis of the other aperture defining a vertical plane. The one aperture is displaced downwardly and outwardly from the other aperture with the axis thereof extending generally parallel to and removed from the vertical plane. The sight housing has adjustment means for selectively moving the reticle indicia relative to the housing in a direction generally parallel to the vertical plane and additional adjustment means for selectively moving the reticle indicia relative to the housing in a direction generally perpendicular to the vertical plane.

Further, in general, and in one form of the invention, a firearm sight, which while not restricted thereto, is particularly suited for attachment to a handgun such as a revolver where deposits of lead, powder and other fouling materials may occur in an area rearward of the handgun muzzle when the handgun is discharged is provided where the sight, when secured to such a handgun, has one portion, including an exposed optical surface through which a target may be viewed, disposed rearward of the area and another portion laterally offset from the one portion and extending forward of the area toward the handgun muzzle for providing a reticle image and rib means protruding from the another portion and extending therealong for preventing the deposition of fouling materials on the exposed optical surface.

BRIEF DESCRIPTION OF THE DRAWING

Corresponding reference characters indicate corresponding parts throughout the several views of the drawing.

The following examples illustrate the invention and are not to be construed as limiting in any manner.

DESCRIPTION OF THE PREFERRED EMBODIMENT

Figure 1:
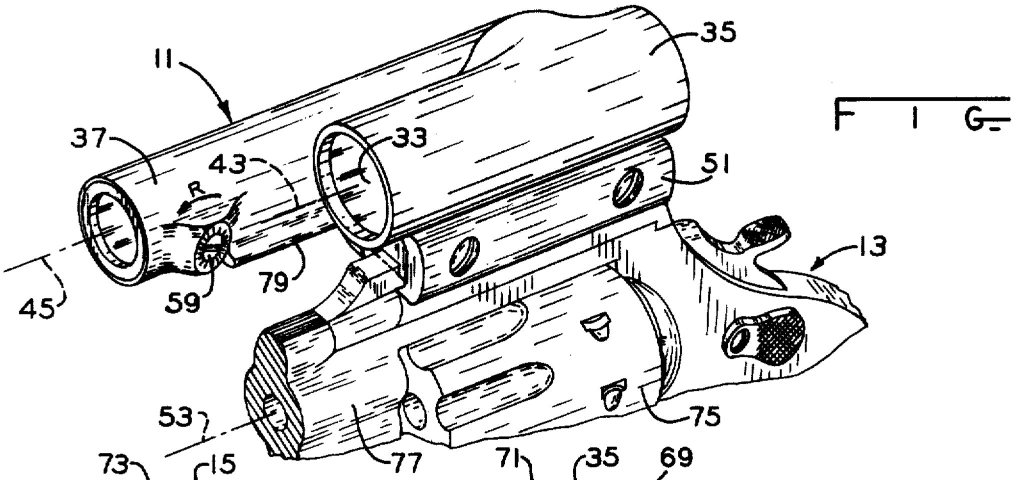
FIG. 1 is a perspective view of a firearm sight according to the present invention including a portion of an illustrative revolver to which the sight is attached.

Referring now to the drawing in greater detail, there is indicated generally at 11 in FIG. 1, a firearm sight attached to an illustrative firearm such as the revolver 13. Optically, the sight has a beam combining mirror 15, which is semitransparent and may be frequency discriminating to superimpose a target view and a reticle image. As depicted, the target is viewed through the mirror 15 and the reticle image is reflected off the mirror 15 toward the observer. The reticle image is provided by light coming from the same general area as the target and passing through a reticle or reticle indicia 17 of transparent lines or marks on an otherwise opaque background. The reticle 17 may be of a type of photographic film supported on a window 19 or may be in any conventional form such as for example openings in a thin metallic plate. The reticle is supported on a tapered tube 21 and is movable against tension supplied by spring 23 for changing the aim of the sight. Light from the general target area passes through a front window 25, the supporting window 19 and through the marks of the reticle 17, leftwardly through the tapered tube and is reflected from a fully reflective optical element, such as a first surface mirror 27, to pass through a lens 29, which functions to collimate the reticle image and make that image appear substantially paralax free with a distant target. The reticle image is further reflected from a semitransparent optical element 15 toward the observer. The observer views the target through the mirror 15 and the reticle image reflected from the mirror 15, thus the mirrors or optical elements 15 and 27 are arranged in periscopic relation to superimpose the reticle image and the target view. Additional windows 31 and 33 may be provided in the sight path from the observer to a target primarily for protecting the internal sight optical surfaces from dirt, moisture and the like.

The housing for the sight 11 may be fabricated in two portions 35 and 37 with the two portions being joined along surface 39 during assembly of the internal elements. The two portions 35 and 37 may be joined together by screws extending between the two portions and/or, by a hollow sleeve 41 which simultaneously provides a light pathway between the two portions and a mechanical connection therebetween. The sleeve 41 snugly engages transverse apertures in each portion and may be fastened to each portion by an adhesive material such as "loctite", which is a material frequenty employed for securing screws and which hardens when deprived of an oxygen environment. The sleeve and adhesive provides the further benefit of forming a good seal of the joint between the two portions 35 and 37 to insure that no dirt or moisture enters the sight interior by way of this joint. The sleeve 41 also provides a narrow annular optical element mounting surface for the lens 29.

Each housing portion has a cylindrical aperture therein, identified by their respective center lines 43 and 45 as well as transverse apertures identified by their respective center lines 47 and 49, which respectively communicate with the corresponding cylindrical apertures and one another. When joined together, the transverse apertures have a common center line.

Figure 3:
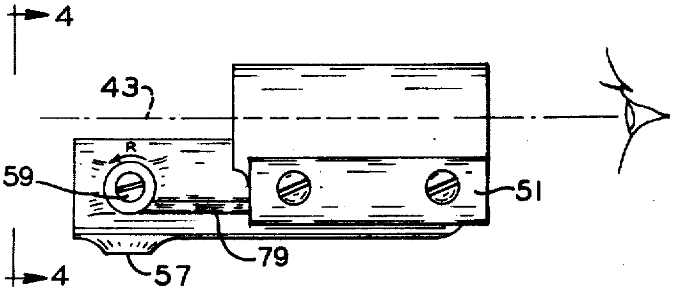
FIG. 3 is a side elevational view of the sight of FIG. 1 illustrating the sight path from an observer through the sight to a target.

The profile (FIG. 3) of the sight 11 of the present invention is reduced, as seen in FIG. 1, by displacing the housing portion 37, having aperture 45 therein, downwardly and outwardly from portion 35, which portion is secured to the firearm 13 by mounting means 51 which fastens the portion 35 to a pair of grooves on the firearm, for example, of the type described in the aforementioned simultaneously filed copending application Ser. No. 562,498.

Figure 4:
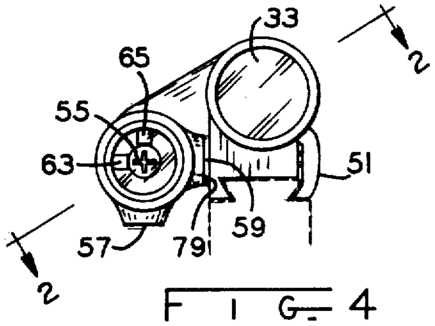
FIG. 4 is an end elevational view of the end of the sight visible in FIG. 1.

Thus the aperture 43 when mounted on the firearm lies in close proximity to the barrel bore, identified by its center line 53. Thus center lines 43 and 53 are in close proximity and extend generally parallel to one another to define a vertical plane when the firearm is in its typical use attitude with the aperture 45 lying generally parallel to and removed from that vertical plane. Of course the sight could be attached shifted laterally so that this plane is not truly vertical however the plane provides a convenient reference. The center line 47 or 49 which represents the sight path between portions 35 and 37 lies oblique to this vertical plane and as depicted in FIG. 4, preferably intersects the vertical plane at an angle between 40° and 80° with about 60° being a preferred oblique angle for one current revolver model. Although the center line 47 or 49 is disposed at 60° to the vertical in one exemplary embodiment, the reticle indicia, which comprises a pair of elongated orthogonal marks 55 on an otherwise opaque background, has those marks extending horizontally and vertically, and the sight is further provided with a first adjustment means such as adjustment screw 57 for selectively moving the indicia relative to the housing in a direction generally parallel to the vertical plane and second adjustment means such as the adjustment screw 59 for selectively moving the reticle indicia relative to the housing in a direction generally perpendicular to the vertical plane with these two orthogonal directions of adjustment corresponding to the directions of elongation of the orthogonal indicia marks. The adjustment screws engage the tapered tube 21, which is pivotable at the end thereof opposite the adjustment screws in a pliable sealant material 61 and the tapered tube 21 is urged toward the two adjustment screws by a spring.

The spring may be a piano wire or leaf spring engaging the tapered tube 21 about 135° around the tube from either adjustment screw, however in one preferred form this spring is uniquely fabricated and supported within the portion 37 by forming the spring of at least part of a cylinder of spring material with two strips 63 and 65 cut out of the cylinder and permanently deformed to push inwardly to engage the tapered tube 21. The remaining portions of the cylinder such as 67 snugly engage the interior of the cylindrical aperture 45 and are fastened therein, for example, by an adhesive material.

The concept of employing sleeves and adhesive material within the cylindrical apertures for assembly purposes is a recurring theme in the present invention. Thus, the window 33 is held in position by abutting it against the recessed surface 69 and adhering a sleeve 71 within the aperture 43. Sleeve 71 has the end opposite window 33 cut obliquely, for example, at 45° to the axis 43 and provides one surface for mounting the mirror 15. Another sleeve 73 cut off obliquely at a corresponding angle then provides the other support surface for the mirror 15, while simultaneously providing a first annular support surface for a window 31. Sleeves 73 and 41 are not only cut at a first 45° angle to provide half of an annular support surface, they are further cut at a second 45° angle perpendicular to the first to provide the sight path along the axis 47 – 49.

Figure 2:
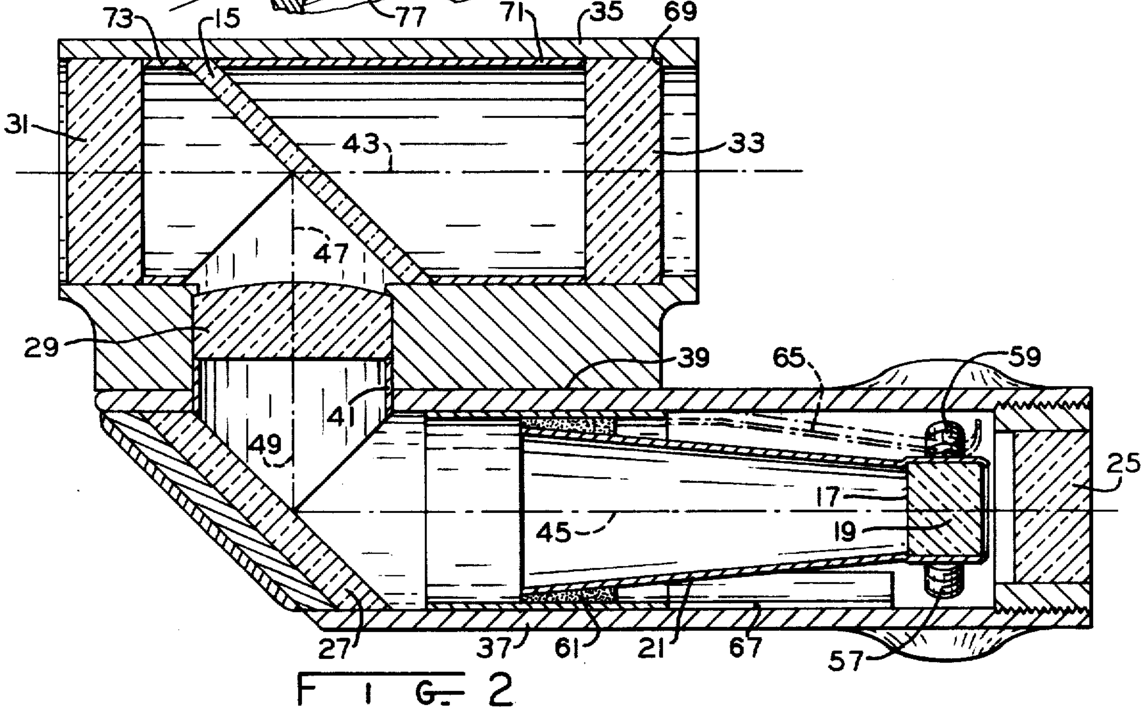
FIG. 2 is a cross sectional view of the sight of FIG. 1 along the oblique line 1—2 of FIG. 4.

The sight of the present invention has a number of exposed optical surfaces with varying obscuration problems depending on their location and the environment of the sight. In conjunction with the exemplary revolver 13 of FIG. 1, the window 33 lies in an area where deposits of lead, powder and other fouling materials may occur rearward of the muzzle when the handgun is discharged. With such a revolver this occurs in the region of the gap between the cylinder 75 and the barrel 77. To prevent the deposition of fouling materials the window 33 is recessed as indicated by the annular mounting surface 69, rather than lying at the front or right most edge of the portion 35 of FIG. 2. Further shielding is provided by an elongated rib 79, which extends from the housing portion 37 with the direction of rib elongation lying generally parallel to the axis 45. The housing portion 37 extends in the direction of the aperture 45 beyond the portion 35 sufficiently far to allow the adjustment screws 57 and 59 to extend from the portion 37 in a region beyond the axial extent of the portion 35. The housing is thicker in the areas where the threaded holes are provided for the adjustment screws with the horizontal adjustment screw 59 lying on the side of the portion 37 adjacent to the vertical plane defined by the barrel axis 53 and sight path 43 and the elongated rib 79 extends from the horizontal adjustment screw backwardly at least beyond the front surface of the housing portion 35.

The foregoing description is exemplary, for example, in that light pathways, as well as apertures have been defined by reference to their center lines where in fact, the light may not be traversing that center line. Further numerous modifications to the above preferred embodiment will readily suggest themselves to those of ordinary skill in the art and accordingly, the scope of the present invention is to be measured only by that of the appended claims.

What is claimed is:

1. A firearm sight for attachment to a pair of generally parallel grooves on a firearm comprising a housing having two portions and having a pair of generally cylindrical axially extending apertures, one in each portion and displaced one from the other with the axes thereof extending generally parallel to one another, a reticle indicia, means supporting the reticle indicia in one of the apertures, means for superimposing a view of the reticle indicia and a target view through the other of the apertures including at least a collimating lens, a first fully reflective optical element and a second semitransparent optical element arranged in periscopic relation and fixed within the housing, mounting means integral with the housing portion having the said other aperture for securing the sight to the pair of generally parallel grooves on the firearm with the other aperture extending generally parallel to and in close proximity to the bore of the firearm barrel and with the axis of the firearm barrel bore and the axis of the other aperture defining a vertical plane, the said one aperture being displaced downwardly and outwardly from the other aperture with the axis thereof extending generally parallel to and removed from the vertical plane, first adjustment means for selectively moving the reticle indica relative to the housing in a direction generally parallel to the verticla plane, second adjustment means for selectively moving the reticle indicia relative to the housing in a direction generally perpendicular to the vertical plane the first and second adjustment means including first and second adjustment screws passing through the housing in generally mutually perpendicular directions for selectively moving the reticle indicia relative to the housing to thereby provide independent horizontal and vertical change of aim of the sight, the first and second optical elements providing a line of sight from the observer to the reticle indicia means which is deviated from the sight path through the housing other aperture in a direction oblique to both of the generally mutually perpendicular adjustment screw directions, one portion of the housing surrounding said one aperture extending in the direction of the one aperture axis beyond the other portion of the housing surrounding the said other aperture a distance sufficient to allow the first and second adjustment screws to extend from the one portion horizontally and downwardly respectively in a region beyond the axial extent of the other portion, and wherein deposits of lead, powder and other fouling materials may occur rearward of the muzzle when the handgun is discharged, and wherein the sight has exposed optical surfaces through which a target is viewed, the sight housing including shielding means for preventing the deposition of fouling materials on the exposed optical surfaces, one said exposed optical surface being located in the said other aperture near one end of the said other housing portion, the shielding means comprising an elongated rib extending from the said one housing portion with the direction of rib elongated lying generally parallel to the one aperture axis.

2. A firearm sight for attachment to a pair of generally parallel grooves on a firearm comprising a housing having two portions and having a pair of generally cylindrical axially extending apertures, one in each portion and displaced one from the other with the axes thereof extending generally parallel to one another, a reticle indicia, means supporting the reticle indicia in one of the apertures, means for superimposing a view of the reticle indicia and a target view through the other of the apertures including at least a collimating lens, a first fully reflective optical element and a second semitransparent optical element arranged in periscopic relation and fixed within the housing, mounting means integral with the housing portion having the said other aperture for securing the sight to the pair of generally parallel grooves on the firearm with the other aperture extending generally parallel to and in close proximity to the bore of the firearm barrel and with the axis of the firearm barrel bore and the axis of the other aperture defining a vertical plane, the said one aperture being displaced downwardly and outwardly from the other aperture with the axis thereof extending generally parallel to and removed from the vertical plane, first adjustment means for selectively moving the reticle indicia relative to the housing in a direction generally parallel to the vertical plane, second adjustment means for selectively moving the reticle indicia relative to the housing in a direction generally perpendicular to the vertical plane, the first and second adjustment means including first and second adjustment screws passing through the housing in generally mutually perpendicular directions for selectively moving the reticle indicia relative to the housing to thereby provide independent horizontal and vertical change of aim of the sight, the first and second optical elements providing a line of sight from the observer to the reticle indicia means which is deviated from the sight path through the housing other aperture in a direction oblique to both of the generally mutually perpendicular adjustment screw directions, one portion of the housing surrounding said one aperture extending in the direction of the one aperture axis beyond the other portion of the housing surrounding the said other aperture a distance sufficient to allow the first and second adjustment screws to extend from the one portion horizontally and downwardly respectively in a region beyond the axial extent of the other portion, and wherein deposits of lead, power and other fouling materials may occur rearward of the muzzle when the handgun is discharged, and wherein the sight has exposed optical surfaces through which a target is viewed, the sight housing including shielding means for preventing the deposition of fouling materials on the exposed optical surfaces, one said exposed optical surface being a window in the sight path, and the shielding means comprises an elongated rib extending from the housing and at least between the first adjustment screw and the vicinity of the window.

3. The sight of claim 2 wherein the direction of sight path deviation is in the neighborhood of 60° to the vertical direction.

4. A collimating type firearm sight having a collimating lens and a housing including first and second portions with each portion having at least one generally cylindrical aperture therein forming respective light passageways and a transverse generally cylindrical aperture in each portion intersecting the respective light passageways and communicating with the corresponding transverse aperture in the opposite portion when the two portions are adjoined for attaching to a handgun where deposits of lead, powder and other fouling material may occur in an area rearward of the handgun muzzle when the handgun is discharged, the sight when secured to such a handgun having the first portion including an exposed optical surface through which a target may be viewed disposed rearward of the area and the second portion laterally offset from the first portion and extending forward of the area toward the handgun muzzle for providing a reticle indicia image, first and second adjustment screws passing into the sight second portion in generally mutually perpendicular directions for selectively moving the reticle indicia image relative to a viewed target, rib means protruding from the second portion near the adjustment screws and extending along the second portion past the exposed optical surface for preventing the deposition of fouling materials on the exposed optical surface, the said first portion including means for securely fastening the sight to the handgun and the said second portion being fastened to the said first portion by means including a hollow sleeve snugly engaging the respective transverse apertures in the first and second portions to simultaneously provide a light pathway between the portions through the sleeve and a mechanical connection between the portions, an adhesive material securing the hollow sleeve to both the first and second portion to thereby form a moisture tight seal of the joint between the first and second portions with one end of the sleeve forming a narrow annular optical element mounting surface for engaging and supporting the collimating lens within one transverse aperture.

* * * * *